(12) United States Patent
Mizoguchi et al.

(10) Patent No.: US 9,651,773 B2
(45) Date of Patent: May 16, 2017

(54) OPTICAL DEVICE, IMAGE DISPLAY DEVICE, AND METHOD OF MANUFACTURING OPTICAL DEVICE

(71) Applicant: Seiko Epson Corporation, Tokyo (JP)

(72) Inventors: Yasushi Mizoguchi, Suwa (JP); Shinichi Wakabayashi, Suwa (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 14/978,355

(22) Filed: Dec. 22, 2015

(65) Prior Publication Data
US 2016/0187645 A1    Jun. 30, 2016

(30) Foreign Application Priority Data
Dec. 26, 2014 (JP) ................. 2014-265636

(51) Int. Cl.
| | |
|---|---|
| G02B 26/08 | (2006.01) |
| G02B 26/10 | (2006.01) |
| G03B 21/00 | (2006.01) |
| G03B 21/14 | (2006.01) |
| G03B 21/28 | (2006.01) |

(52) U.S. Cl.
CPC ....... *G02B 26/0875* (2013.01); *G02B 26/085* (2013.01); *G02B 26/105* (2013.01); *G03B 21/006* (2013.01); *G03B 21/142* (2013.01); *G03B 21/28* (2013.01)

(58) Field of Classification Search
CPC .. G02B 26/085; G02B 26/08; G02B 26/0816; G02B 26/0875; H04N 9/3105; H04N 9/3188; H02K 11/215; H02K 33/00; H02K 35/02; H02K 35/04; G03B 21/142; G03B 21/28; G03B 21/006
USPC ....... 359/199.3, 200.7, 225.1, 226.2; 353/22, 353/98
See application file for complete search history.

(56) References Cited

U.S. PATENT DOCUMENTS

| | | | |
|---|---|---|---|
| 2011/0234650 A1 | 9/2011 | Watanabe | |
| 2014/0022655 A1* | 1/2014 | Cheng | G02B 6/4457 359/824 |
| 2014/0092476 A1 | 4/2014 | Ando et al. | |

FOREIGN PATENT DOCUMENTS

| | | |
|---|---|---|
| EP | 0520387 A2 | 12/1992 |
| JP | 2011-158589 A | 8/2011 |
| JP | 2011-203460 A | 10/2011 |

OTHER PUBLICATIONS

Extended European Search Report for EP Application No. 15201984.0 dated Apr. 26, 2016 (6 pages).

* cited by examiner

*Primary Examiner* — James Phan
(74) *Attorney, Agent, or Firm* — Harness, Dickey & Pierce, P.L.C.

(57) ABSTRACT

An optical device includes a glass plate, a movable section adapted to support the glass plate, shaft sections adapted to support the movable section so as to be able to oscillate around an oscillation axis, a support section adapted to support the shaft sections, a permanent magnet provided to the movable section, and a coil disposed so as to be opposed to the permanent magnet, and generating a magnetic field acting on the permanent magnet, and the support section has a window section through which a gap between the permanent magnet and the coil can visually be recognized.

15 Claims, 11 Drawing Sheets

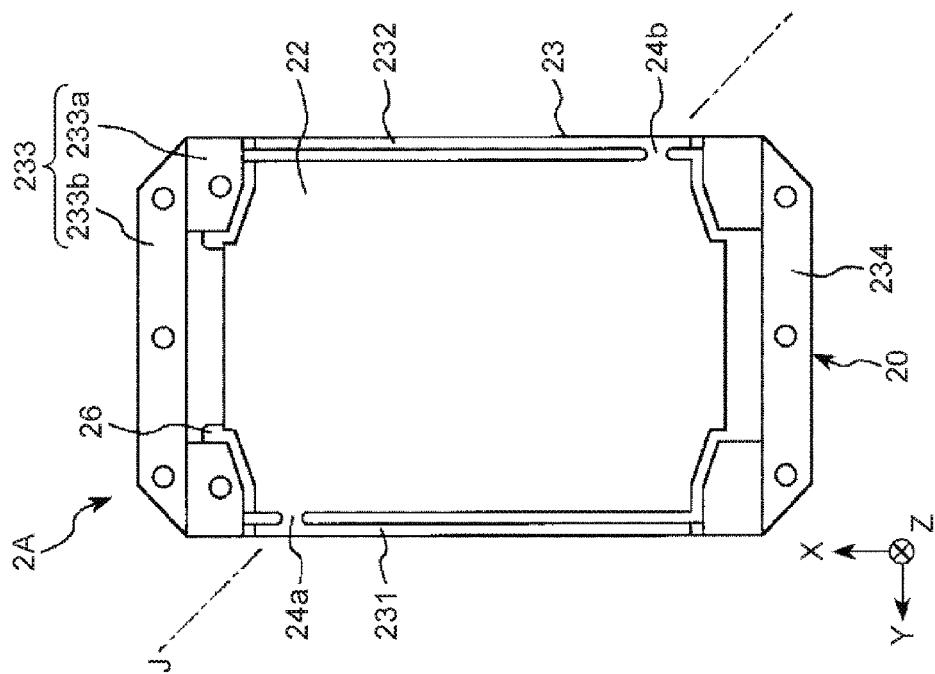
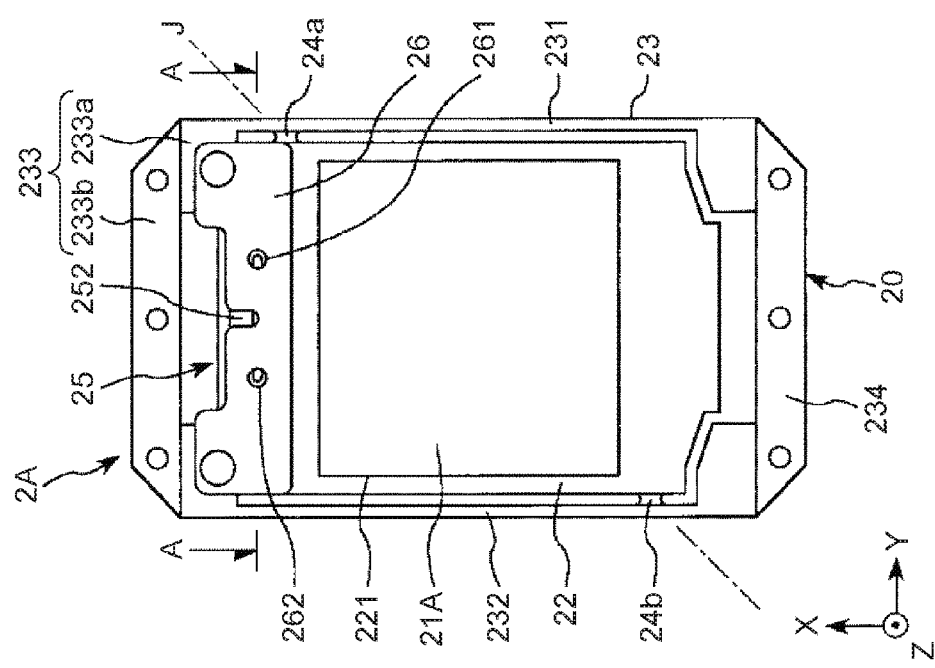

OPTICAL DEVICE, IMAGE DISPLAY DEVICE, AND METHOD OF MANUFACTURING OPTICAL DEVICE

BACKGROUND

1. Technical Field

The present invention relates to an optical device, an image display device, and a method of manufacturing an optical device.

2. Related Art

In the past, there has been known a technology of shifting an axis of picture light emitted from a light modulation device such as a liquid crystal panel in order to make the resolution of an image to be projected higher than the resolution of the light modulation device. Further, as a device for shifting the axis of the picture light, there has been known a light path control device described in JP-A-2011-158589 (Document 1). The light path control device described in Document 1 includes a glass plate, a movable section for holding the glass plate, a support section for supporting the movable section, and a pair of plate springs for connecting the movable section and the support section to each other, and rotates the movable section around the plate springs used as a rotational axis to thereby change the posture of the glass plate to refract light (picture light) having entered the glass plate to thereby shift the axis. Further, in the light path control device described in Document 1, electromagnetic drive using a coil and a permanent magnet is adopted as a drive mechanism for rotating the movable section.

In such a drive mechanism using the electromagnetic drive as described in Document 1, since the arrangement of (relative positional relationship between) the coil and the permanent magnet has a relatively significant influence on the vibration characteristic, the alignment between the coil and the permanent magnet is important. However, in Document 1, a matter related to the alignment between the coil and the permanent magnet is obscure.

SUMMARY

An advantage of some aspects of the invention is to provide an optical device in which the positional relationship between a coil and a permanent magnet can easily be checked, and which has an excellent vibration characteristic, an image display device provided with such an optical device, and a method of manufacturing an optical device in which the positional relationship between the coil and the permanent magnet can easily be checked, and which has an excellent vibration characteristic.

Such an advantage can be achieved by the following aspects of the invention.

An optical device according to an aspect of the invention includes an optical section having a plane of incidence of light to which light can be input, a movable section adapted to support the optical section, a shaft section adapted to support the movable section so as to be able to oscillate around an oscillation axis, a support section adapted to support the shaft section, a permanent magnet provided to the movable section, and a coil disposed so as to be opposed to the permanent magnet, and generating a magnetic field acting on the permanent magnet, and the support section has a window section through which a gap between the permanent magnet and the coil can be visually recognized.

According to this aspect of the invention, since the positional relationship between the coil and the permanent magnet can easily be checked through the window section, the positional relationship between the coil and the permanent magnet can easily be controlled. Therefore, the optical device having an excellent vibration characteristic can be obtained.

In the optical device according to the aspect of the invention, it is preferable that the window section is a through hole.

According to the aspect of the invention with this configuration, the configuration of the window section becomes simple. Further, it becomes easier to visually recognize the positional relationship between the coil and the permanent magnet.

In the optical device according to the aspect of the invention, it is preferable that a position of a surface of the permanent magnet, with that surface facing the coil, and a position of a surface of the coil, with that surface facing the permanent magnet, can be visually recognized through the window section.

According to the aspect of the invention with this configuration, the gap between the coil and the permanent magnet can more clearly be checked.

In the optical device according to the aspect of the invention, it is preferable that when viewed through the window section, one of the side surfaces constituting the window section coincides with one of the surface of the permanent magnet, with that surface facing the coil, and the surface of the coil, with that surface facing the permanent magnet.

According to the aspect of the invention with this configuration, since the side surface of the window section can be used as a reference surface for determining the gap between the coil and the permanent magnet, the gap can more clearly be checked.

In the optical device according to the aspect of the invention, it is preferable that the gap can be visually recognized through the window section from a direction perpendicular to a direction in which the permanent magnet and the coil are arranged.

According to the aspect of the invention with this configuration, the gap between the permanent magnet and the coil can more clearly be checked.

In the optical device according to the aspect of the invention, it is preferable that the coil is an air core coil.

According to the aspect of the invention with this configuration, a more excellent vibration characteristic can be exerted.

In the optical device according to the aspect of the invention, it is preferable that the coil is supported by the support section.

According to the aspect of the invention with this configuration, the coil can easily be fixed to a predetermined position.

In the optical device according to the aspect of the invention, it is preferable to further include a holding section fixed to the support section, and holding the coil from an opposite side to the permanent magnet.

According to the aspect of the invention with this configuration, the alignment of the coil can easily be performed.

In the optical device according to the aspect of the invention, it is preferable that the holding section is made of a nonmagnetic material.

According to the aspect of the invention with this configuration, since the formation of the magnetic path due to the holding section is suppressed, it is possible to make the magnetic field generated by the coil efficiently act on the permanent magnet.

In the optical device according to the aspect of the invention, it is preferable that the movable section and the shaft section each include a resin material.

According to the aspect of the invention with this configuration, it is possible to soften the structure around the shaft section, and it is possible to lower the resonant frequency while achieving downsizing. Further, it is possible to suppress the variation in the oscillation trajectory of the movable section with respect to the ambient temperature.

In the optical device according to the aspect of the invention, it is preferable that the optical section transmits the light.

According to the aspect of the invention with this configuration, the optical axis of the light can be shifted using the refraction in the optical section.

In the optical device according to the aspect of the invention, it is preferable that the optical section reflects the light.

According to the aspect of the invention with this configuration, it is possible to reflect the light to perform a scanning operation.

An image display device according to another aspect of the invention includes the optical device according to any of the above aspects of the invention, and the image display device is configured so as to make the optical device spatially modulate the light to thereby shift a position of a pixel displayed by irradiation of the light.

According to this aspect of the invention, an image display device having an excellent display characteristic can be provided.

An image display device according to still another aspect of the invention includes the optical device according to any of the above aspects of the invention, and the image display device reflects the light with the optical device to perform a scanning operation to thereby display an image.

According to this aspect of the invention, an image display device having an excellent display characteristic can be provided.

A method of manufacturing an optical device according to yet another aspect of the invention includes providing a structure including an optical section having a plane of incidence of light to which the light is input, a movable section adapted to support the optical section, a shaft section adapted to support the movable section so as to be able to oscillate around an oscillation axis, a support section adapted to support the shaft section, a permanent magnet provided to the movable section, and a window section, which is provided to the support section, and through which a gap between the permanent magnet and a coil can visually be recognized, disposing the coil so as to be opposed to the permanent magnet in a state in which a gap forming member is disposed between the permanent magnet and the coil, and removing the gap forming member from an area between the permanent magnet and the coil through the window section.

According to this aspect of the invention, the positional relationship (the gap) between the coil and the permanent magnet can easily be set to a predetermined value. Therefore, the optical device having an excellent vibration characteristic can easily be manufactured.

BRIEF DESCRIPTION OF THE DRAWINGS

The invention will be described with reference to the accompanying drawings, wherein like numbers reference like elements.

FIGS. 13A and 13B are a top view and a bottom view, respectively, of an optical device provided to the image display device shown in FIG. 12.

DESCRIPTION OF EXEMPLARY EMBODIMENTS

Hereinafter, an optical device, an image display device, and a method of manufacturing the optical device according to the invention will be explained in detail based on some embodiments shown in the accompanying drawings.

First Embodiment

Figure 1:
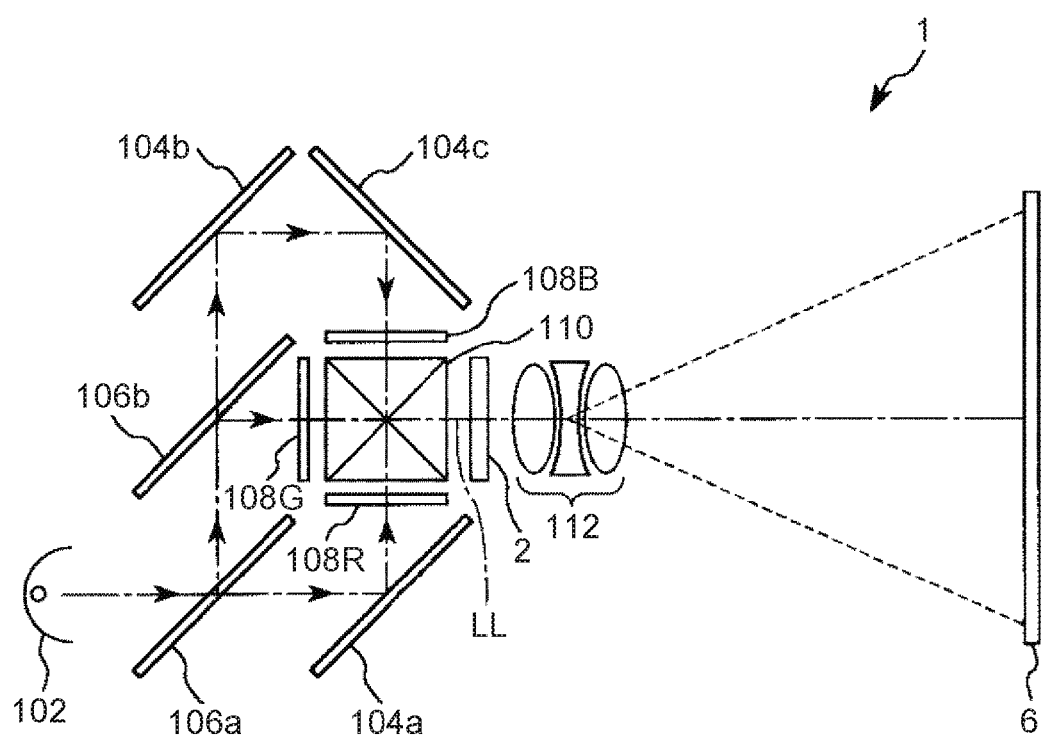
FIG. 1 is a diagram showing an optical configuration of an image display device according to a first embodiment of the invention.
Figure 2:
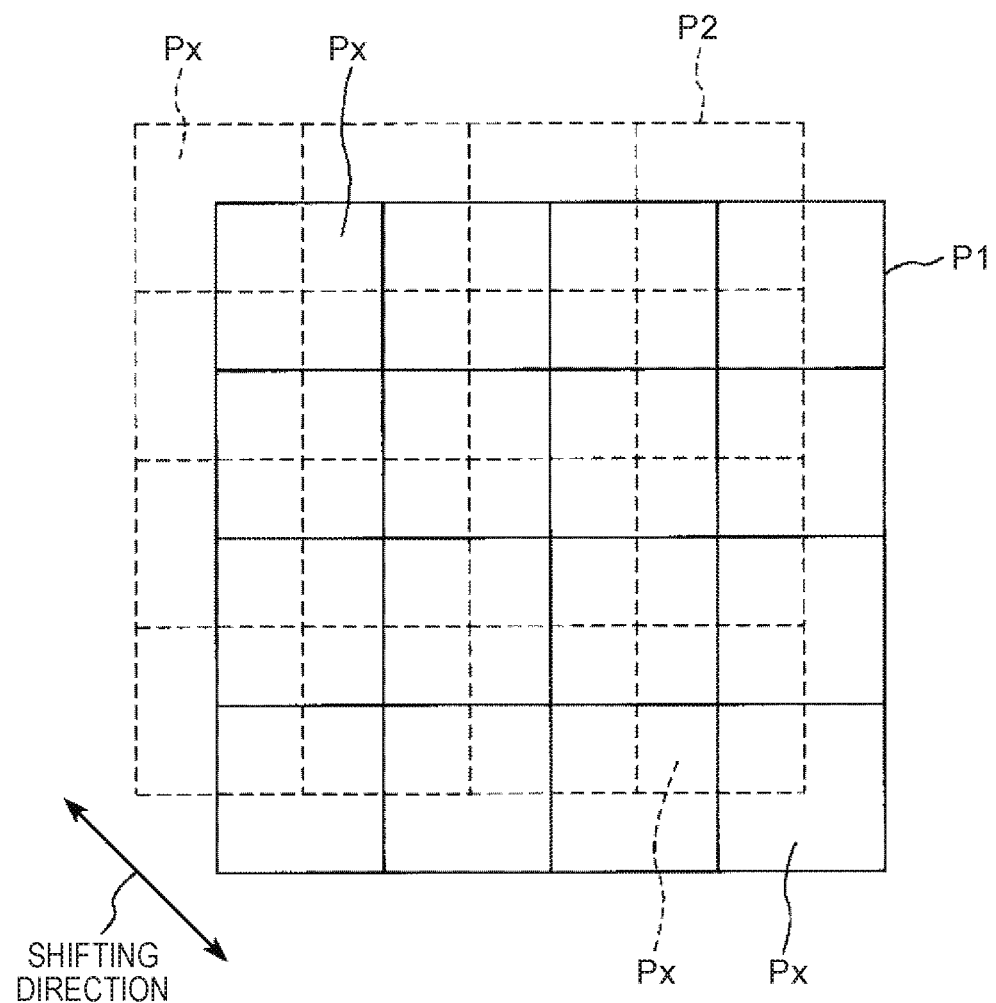
FIG. 2 is a diagram showing a condition in which picture light is shifted.
Figure 3:
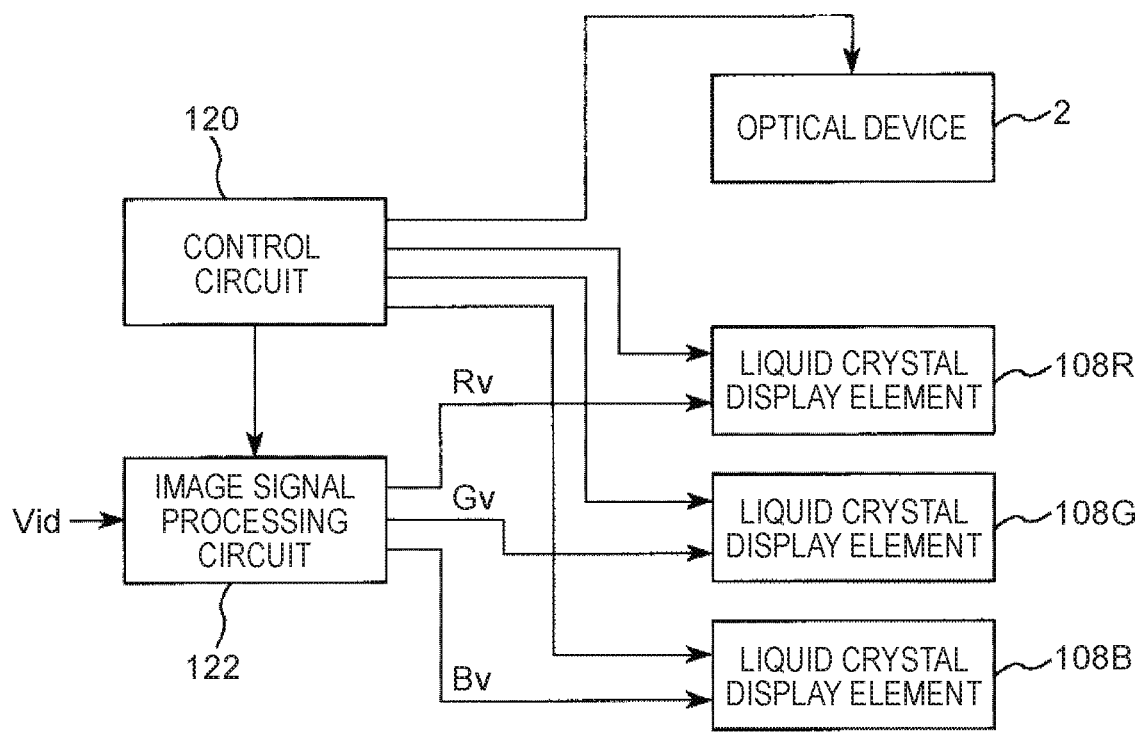
FIG. 3 is a block diagram showing an electrical configuration of the image display device shown in FIG. 1.
Figures 4A, 4B:
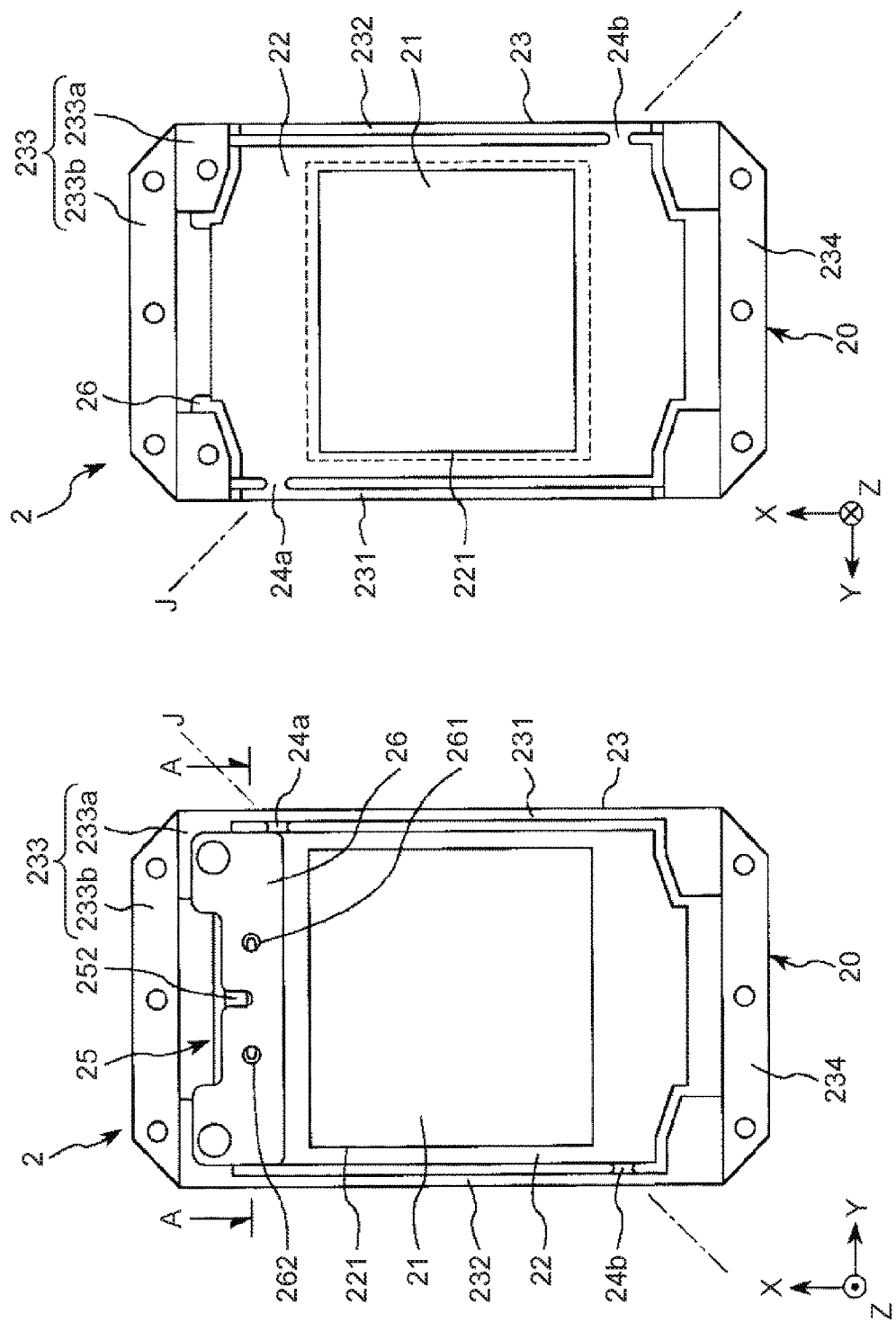
FIGS. 4A and 4B are a top view and a bottom view, respectively, of an optical device provided to the image display device shown in FIG. 1.
Figure 5:
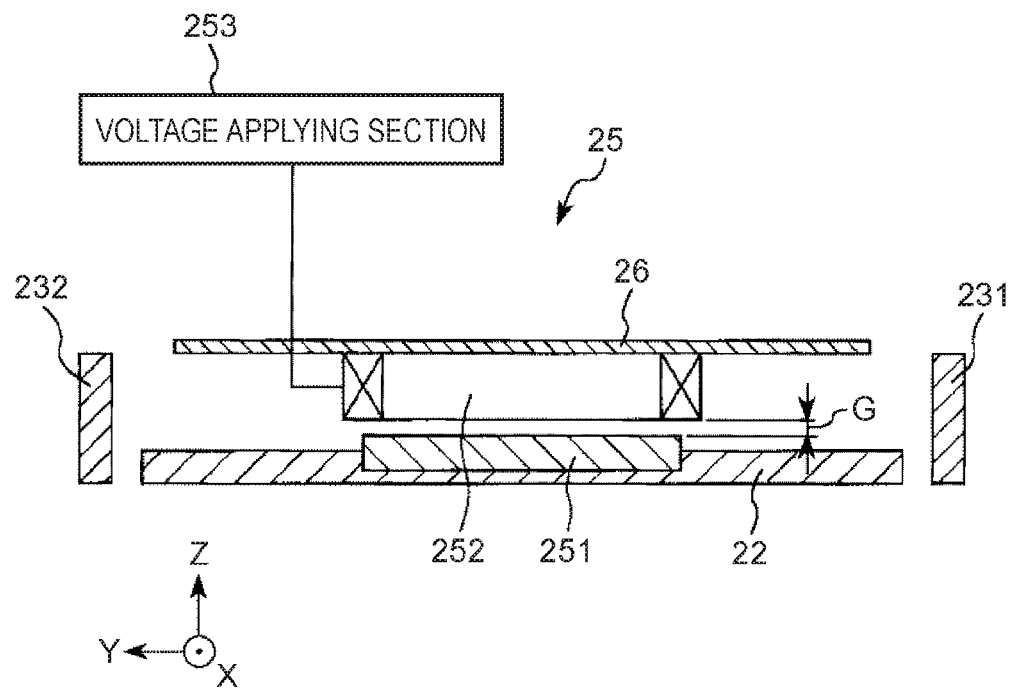
FIG. 5 is a cross-sectional view along the line A-A in FIG. 4A.
Figure 6:
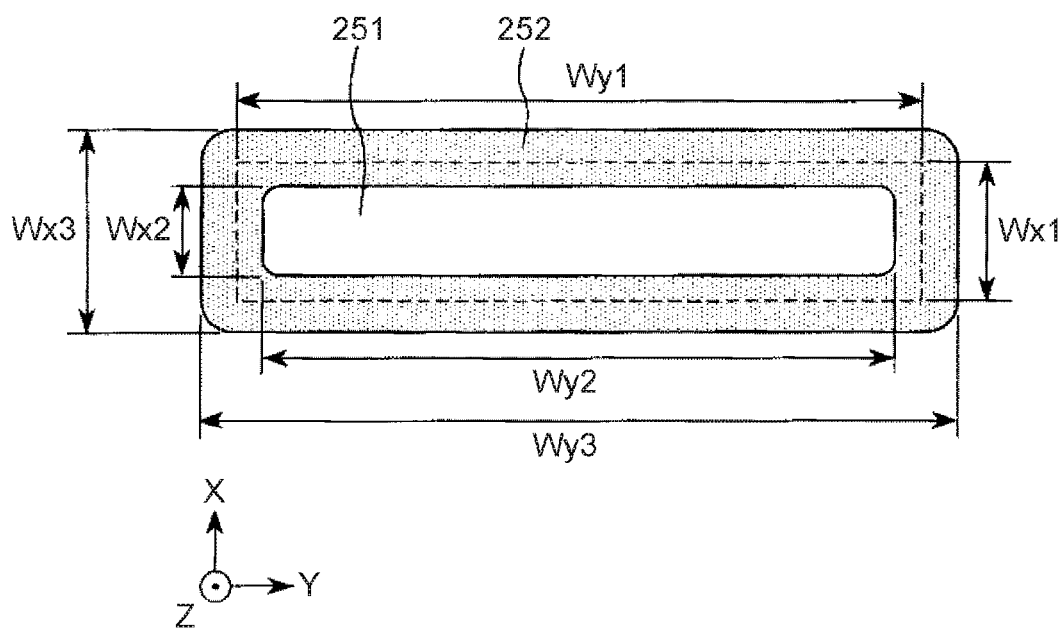
FIG. 6 is a plan view showing an arrangement of a permanent magnet and a coil.
Figure 7:
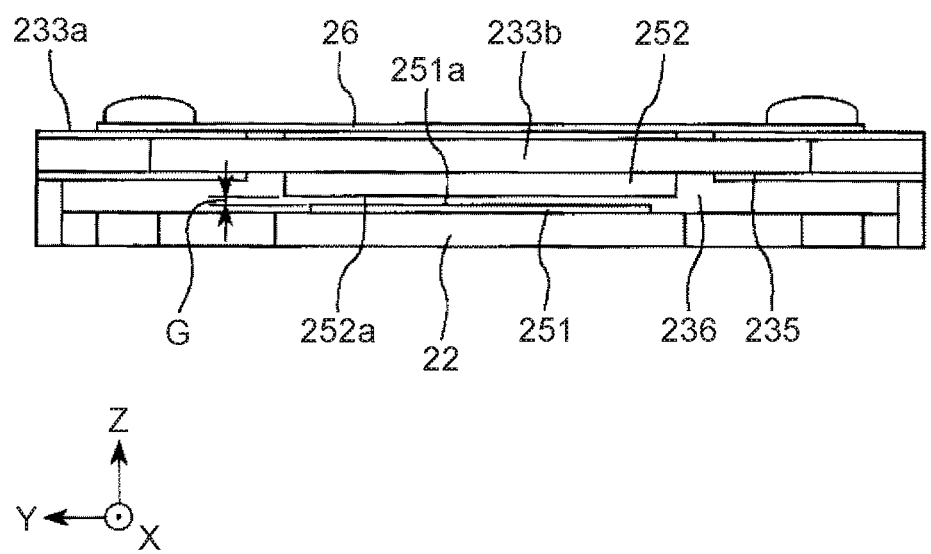
FIG. 7 is a side view of the optical device shown in FIGS. 4A and 4B.
Figure 8A:
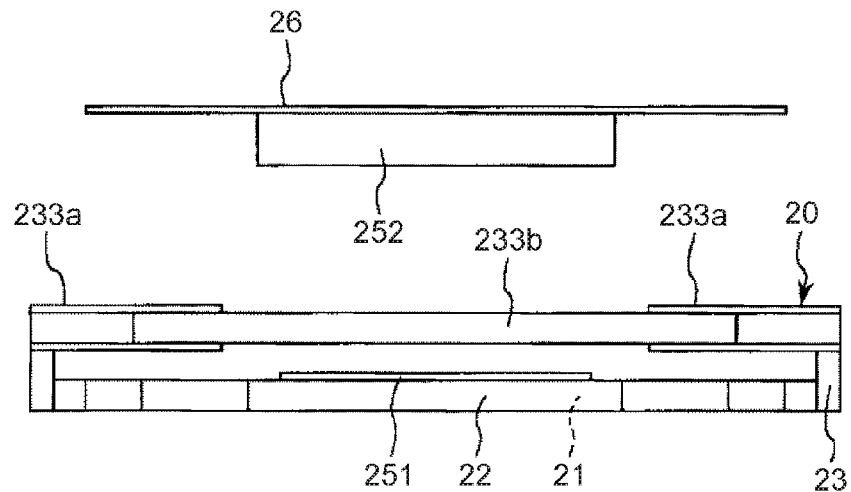
FIGS. 8A through 8C are cross-sectional views for explaining a method of manufacturing the optical device shown in FIGS. 4A and 4B.
Figure 8B:
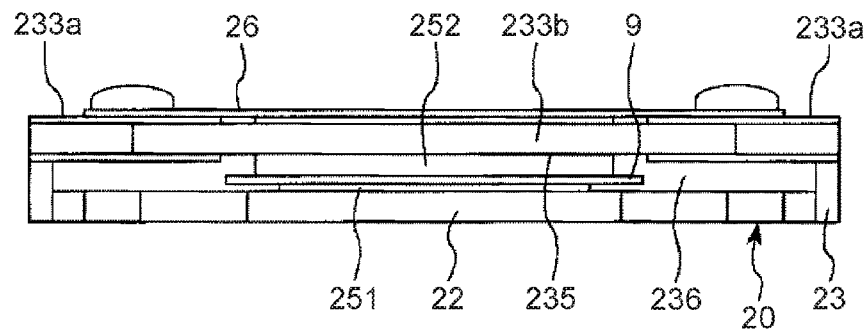
Figure 8C:
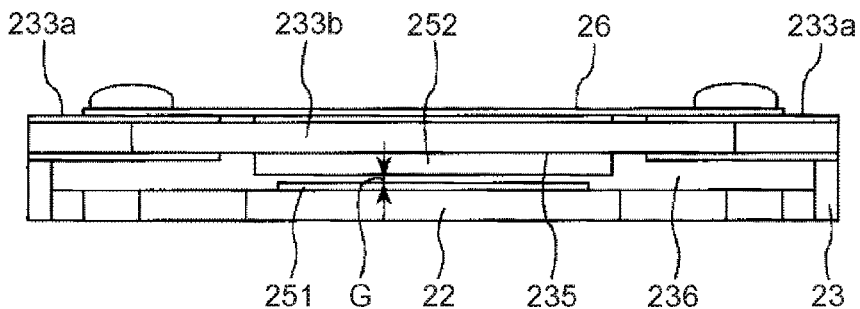

FIG. 1 is a diagram showing an optical configuration of an image display device according to a first embodiment of the invention. FIG. 2 is a diagram showing a condition in which picture light is shifted. FIG. 3 is a block diagram showing an electrical configuration of the image display device shown in FIG. 1. FIGS. 4A and 4B are a top view and a bottom view, respectively, of an optical device provided to the image display device shown in FIG. 1. FIG. 5 is a cross-sectional view along the line A-A in FIG. 4A. FIG. 6 is a plan view showing an arrangement of a permanent magnet and a coil. FIG. 7 is a side view of the optical device shown in FIGS. 4A and 4B. FIGS. 8A through 8C are cross-sectional views for explaining a method of manufacturing the optical device shown in FIGS. 4A and 4B.

It should be noted that, in FIGS. 4A, 4B, 5, and 6, there are shown an X axis, a Y axis, and a Z axis as three axes perpendicular to each other, and the tip side of each of the arrows shown in the drawings is defined as "+ side," and the base end side is defined as "− side" for the sake of convenience of explanation. Further, hereinafter, a direction parallel to the X axis is also referred to as an "X-axis direction," a direction parallel to the Y axis is also referred to as a "Y-axis direction," a direction parallel to the Z axis is also referred to as a "Z-axis direction," and the +Z side is also referred to as "top," and the −Z side is also referred to as "bottom."

1. Projector

A projector (image display device) 1 shown in FIG. 1 is an LCD type projector, and is provided with a light source 102, mirrors 104a, 104b, and 104c, dichroic mirrors 106a, 106b, liquid crystal display elements 108R, 108G, and 108B, a dichroic prism 110, an optical device 2 as a light path deflection element, and a projection lens system 112 as shown in FIG. 1.

As the light source 102, there can be cited, for example, a halogen lamp, a mercury lamp, and a light emitting diode (LED). Further, as the light source 102, there is used a device for emitting white light. Then, the light emitted from the light source 102 is firstly separated by the dichroic mirror 106a into red light (R) and the rest of the light. The red light is reflected by the mirror 104a, then enters the liquid crystal display element 108R, and the rest of the light is further separated by the dichroic mirror 106b into green light (G) and blue light (B). Then, the green light enters the liquid crystal display element 108G, and the blue light is reflected by the mirrors 104b, 104c, and then enters the liquid crystal display element 108B.

The liquid crystal display elements 108R, 108G, and 108B are each used as a spatial light modulator. These liquid crystal display elements 108R, 108G, and 108B are transmissive spatial light modulators corresponding respectively to the primary colors of R, G, and B, and are each provided with pixels arranged in, for example, a 1080×1920 matrix. In each of the pixels, the light intensity of the transmitted light with respect to the incident light is controlled, and in each of the liquid crystal display elements 108R, 108G, and 108B, the light intensity distribution of all of the pixels is controlled in a coordinated manner. The light beams spatially modulated by such liquid crystal display elements 108R, 108G, and 108B are combined by the dichroic prism 110, and the dichroic prism 110 emits full-color picture light LL. Then, the picture light LL thus emitted is enlarged and projected on an object 6 by the projection lens system 112.

Here, the projector 1 includes the optical device 2 disposed between the dichroic prism 110 and the projection lens system 112, and is arranged so as to be able to project an image, which has higher resolution (e.g., 4K in the case in which the liquid crystal display elements 108R, 108G, and 108B are each with the full HD resolution) than the resolution of the liquid crystal display elements 108R, 108G, and 108B, on the object 6 by shifting the optical axis of the picture light LL (by performing so-called "pixel shift") using the optical device 2. This principle will briefly be explained using FIG. 2. The optical device 2 has a glass plate 21 for transmitting the picture light LL, and by changing the posture of the glass plate 21, the optical axis of the picture light LL can be shifted using refraction.

Further, the projector 1 is configured so that the image display position P1 obtained in the case of shifting the optical axis of the picture light LL to one side and the image display position P2 obtained in the case of shifting the optical axis of the picture light LL to the other side are shifted from each other in an oblique direction (the arrow direction in FIG. 2) as much as a half pixel (i.e., a half of the pixel Px) using such a shift of the optical axis, and by alternately displaying images at the image display positions P1, P2, the number of apparent pixels increases to achieve an increase in resolution of the image projected on the object 6. It should be noted that the shift amount between the image display positions P1, P2 is not limited to a half pixel, but can also be, for example, a fourth of the pixel Px, or an eighth thereof.

The projector 1 having such a configuration is provided with a control circuit 120 and an image signal processing circuit 122 in addition to the optical device 2 and the liquid crystal display element 108R, 108G, and 108B as shown in FIG. 3. The control circuit 120 controls a writing operation of a data signal to the liquid crystal display elements 108R, 108G, and 108B, a light path deflection operation in the optical device 2, a data signal generation operation in the image signal processing circuit 122, and so on. Meanwhile, the image signal processing circuit 122 separates the image signal Vid supplied from an external device not shown by the three primary colors of R, G, and B, and at the same time converts the result into data signals Rv, Gv, and By suitable to the operations of the respective liquid crystal display elements 108R, 108G, and 108B. Then, the data signals Rv, Gv, and By thus obtained by the conversion are supplied respectively to the liquid crystal display elements 108R, 108G, and 108B, and the liquid crystal display elements 108R, 108G, and 108B operate based on the data signals Rv, Gv, and Bv, respectively.

2. Optical Device

Then, the optical device 2 incorporated in the projector 1 described above will be explained in detail.

As shown in FIGS. 4A, 4B, 5, and 6, the optical device 2 includes a structure 20 having a movable section 22 provided with the glass plate (an optical section) 21 having a light transmissive property and deflecting the picture light LL, a support section 23 having a frame-like shape and disposed surrounding the movable section 22, and shaft sections 24a, 24b for connecting the movable section 22 and the support section 23 to support the movable section 22 with respect to the support section 23 so as to be able to oscillate (rotate), and a drive mechanism 25 for oscillating the movable section 22 with respect to the support section 23. The optical device 2 having such a configuration is disposed inside the projector 1 so that, for example, the +Z side faces to the dichroic prism 110 side and the −Z side faces to the projection lens system 112 side. It should be noted that the direction of the optical device 2 can be reversed.

The movable section 22 has a plate-like shape, and has a through hole 221 disposed in a central portion of the movable section 22. Further, the glass plate 21 is fitted in the through hole 221, and the glass plate 21 is bonded to the movable section 22 with, for example, an adhesive. It should be noted that the through hole 221 has a step (a stop) on the circumferential surface of the through hole 221, and receives the glass plate 21 with the step. Thus, it becomes easy to dispose the glass plate 21 on the movable section 22.

The glass plate 21 has a rectangular planar shape. The glass plate 21 can transmit the picture light LL having been input while refracting the picture light LL by the incident light of the picture light LL being tilted from 0°. Therefore, by changing the posture of the glass plate 21 so as to achieve the target incident angle, the deflection direction and the deflection amount of the picture light LL can be controlled. It should be noted that the size of such a glass plate 21 is appropriately set so as to be able to transmit the picture light LL emitted from the dichroic prism 110. Further, it is preferable for the glass plate 21 to substantially be colorless and transparent. Further, an antireflection film can be formed on the surface of incidence and the exit surface of the picture light LL of the glass plate 21.

The constituent material of the glass plate 21 is not particularly limited, but a variety of glass materials such as super white glass, borosilicate glass, or quartz glass can be used. Further, although in the present embodiment, the glass plate 21 is used as the optical section, the optical section is not particularly limited providing the optical section is formed of a material having a light transmissive property and capable of refracting the picture light LL, and can also be formed of a variety of crystalline materials such as quartz crystal or sapphire, a variety of resin materials such as polycarbonate resin or acrylic resin, or the like besides the glass. It should be noted that it is preferable to use the glass plate 21 as the optical section as in the present embodiment, and thus, the rigidity of the optical section can particularly be increased, and therefore, the deflection variation of the picture light LL deflected by the optical section can particularly be suppressed.

The support section 23 having a frame-like shape is disposed surrounding the movable section 22 supporting such a glass plate 21, and the movable section 22 and the support section 23 are connected to each other with the shaft sections 24a, 24b. The shaft sections 24a, 24b are disposed so as to be shifted from each other in the X-axis direction and the Y-axis direction in a planar view, and form an oscillation axis J of the movable section 22. Thus, the movable section 22 oscillates around the oscillation axis J tilted about 45° with respect to both of the X axis and the Y axis, and the posture of the glass plate 21 varies with the oscillation. In particular in the optical device 2, since the shaft sections 24a, 24b are disposed point-symmetrically about the center of the glass plate 21 in the planar view, good oscillation balance of the movable section 22 can be achieved. It should be noted that the tilt angle of the oscillation axis J with respect to the X axis (Y axis) is not limited to 45°.

The movable section 22, the support section 23, and the shaft sections 24a, 24b described above are configured as a unit (formed integrally). Thus, it is possible to increase the impact resistance and the long-term durability in the boundary portion between the support section 23 and the shaft sections 24a, 24b and the boundary portion between the shaft sections 24a, 24b and the movable section 22.

Further, the movable section 22, the support section 23, and the shaft sections 24a, 24b are formed of a material lower in Young modulus than the constituent material of the glass plate 21. As the constituent material of these sections, it is preferable to include resin, and further preferable to consist primarily of resin. Thus, it is possible to efficiently inhibit the stress generated due to the oscillation of the movable section 22 from leading to an unwanted vibration of the glass plate 21 itself. Further, it is possible to surround the side surfaces of the glass plate 21 with the soft movable section 22, and thus, it is possible to suppress the stress caused in the glass plate 21 to a low level when changing the posture of the glass plate 21 to suppress an unwanted vibration generated in the glass plate 21 due to the stress distribution to a low level. As a result, it is possible to prevent the image to be deflected by the glass plate 21 from being deflected toward an unintended direction. Further, it is possible to suppress the variation in the oscillation trajectory of the movable section 22 with respect to the ambient temperature. Further, for example, it is possible to make the shaft sections 24a, 24b and the periphery of the shaft sections 24a, 24b sufficiently soft, and it is possible to achieve the optical device 2 small in size and low in resonant frequency (about 60 kHz).

Such resin is not particularly limited, and there can be cited, for example, polyethylene, polypropylene, silicone, polyacetal, polyamide, polycarbonate, polyphenylene ether, polyethylene terephthalate, polybutylene terephthalate, polyarylate, polysulfone, polyether sulfone, polyphenylene sulfide, polyether ether ketone, polyimide, polyetherimide, and fluorine resin, and there is used resin including at least one of these materials.

Then, the drive mechanism 25 for oscillating the movable section 22 will be explained. As shown in FIG. 5, the drive mechanism 25 is an electromagnetic actuator including a permanent magnet 251, a coil 252, and a voltage applying section 253 for applying a drive signal DS as an alternating voltage to the coil 252 to thereby generate a magnetic field acting on the permanent magnet 251 from the coil 252. By using the electromagnetic actuator as the drive mechanism 25, sufficient force for oscillating the movable section 22 can be generated, and therefore, it is possible to smoothly oscillate the movable section 22.

The permanent magnet 251 is disposed an edge portion of the movable section 22, and has an elongated shape along the Y-axis direction. Further, the permanent magnet 251 is magnetized in the Z-axis direction (the thickness direction of the movable section 22). Such a permanent magnet 251 is not particularly limited, and there can be used, for example, a neodymium magnet, a ferrite magnet, a samarium-cobalt magnet, and an alnico magnet.

On the other hand, the coil 252 is disposed so as to be opposed to the permanent magnet 251 in the Z-axis direction (the thickness direction of the movable section 22) with a distance of a predetermined gap G. The gap G is not particularly limited, but is preferably in a range of, for example, no smaller than 0.1 mm and no larger than 1 mm, and more preferably in a range of no smaller than 0.2 mm and no larger than 0.4 mm although differing by the size of the permanent magnet 251 and the strength of the magnetic field generated by the coil 252. Thus, it is possible to make the magnetic field generated by the coil 252 more efficiently act on the permanent magnet 251 while preventing the contact between the permanent magnet 251 and the coil 252 when the movable section 22 oscillates. Therefore, it is possible to more efficiently and stably oscillate the movable section 22.

Further, the coil 252 is an air core coil. By adopting the air core coil as described above, it is possible to more smoothly oscillate the movable section 22 provided with the permanent magnet 251. In the more specific explanation, in the case of, for example, using a coil having a magnetic core disposed inside as the coil 252, the permanent magnet 251 is attracted by the magnetic core depending on the strength of the magnetic force generated, and thus, the oscillation axis J is displaced to make it unachievable to smoothly and accurately oscillate the movable section 22 in some cases. In order to prevent such a problem from occurring, it is preferable to use such an air core coil as in the present embodiment as the coil 252.

Further, as shown in FIG. 6, the coil 252 has a roughly rectangular shape corresponding to the planar shape of the permanent magnet 251. Further, when assuming that the width of the permanent magnet 251 in the long axis direction (the Y-axis direction) is Wy1, the width of the inner circumference of the coil 252 is Wy2, and the width of the outer circumference of the coil 252 is Wy3, the relationship of Wy2<Wy1<Wy3 is satisfied, and when assuming that the width of the permanent magnet 251 in the short axis direction (the X-axis direction) is Wx1, the width of the inner circumference of the coil 252 is Wx2, and the width of the outer circumference of the coil 252 is Wx3, the relationship of Wx2<Wx1<Wx3 is satisfied. As described above, by making the inner circumference of the coil 252 smaller than the outline of the permanent magnet 251, the power loss (e.g., heat generation) when applying the current to the coil 252 can be suppressed, and it is possible to generate the magnetic field from the coil 252 more efficiently and in a power-saving manner.

Moreover, the center (centroid) of the permanent magnet 251 and the center (centroid) of the coil 252 roughly coincide with each other in a planar view viewed from the Z-axis direction, and the outer circumference of the permanent magnet 251 overlaps the coil 252. Thus, it is possible to make the magnetic field generated by the coil 252 efficiently act on the permanent magnet 251.

The drive mechanism 25 having such a configuration oscillates the movable section 22 in the following manner. In the case in which the drive signal is not applied from the voltage applying section 253 to the coil 252, the movable section 22 remains substantially parallel to the X-Y plane. Then, when the drive signal is applied from the voltage applying section 253 to the coil 252, the movable section 22 oscillates (rotates) around the oscillation axis J with respect to the support section 23. Then, the optical axis of the picture light LL is shifted due to such an oscillation of the movable section 22, and the images are alternately displayed at the image display positions P1, P2. Therefore, the number of apparent pixels increases to achieve an increase in resolution of the image.

The coil 252 provided to such a drive mechanism 25 as described above is fixed to the support section 23 via a holding section 26. By fixing the coil 252 to the support section 23 in such a manner, the coil 252 can easily be fixed to a predetermined position. In particular, by fixing the coil 252 to the support section 23 via the holding section 26 as in the present embodiment, the position of the coil 252 with respect to the permanent magnet 251 can be adjusted by, for example, adjusting the fixation position of the holding section 26 with respect to the support section 23. Therefore, the alignment between the permanent magnet 251 and the coil 252 can easily be performed.

Further, the holding section 26 holds the coil 252 from the opposite side to the permanent magnet 251. In other words, the holding section 26 is disposed so as not to located between the permanent magnet 251 and the coil 252. Thus, the gap G between the permanent magnet 251 and the coil 252 can more accurately be adjusted. Further, the contact between the permanent magnet 251 and the holding section 26 when oscillating the movable section 22 can be prevented.

Further, the holding section 26 is provided with two through holes 261, 262, and a part of the inner circumference of the coil 252 can visually be recognized via the through holes 261, 262. In other words, the through holes 261, 262 are formed so as to overlap the inner circumference of the coil 252. Thus, in the case of fixing the coil 252 to the holding section 26, by visually recognize the inner circumference of the coil 252 via the through holes 261, 262, the positioning can easily be performed.

Further, the holding section 26 is made of a nonmagnetic material. Thus, since the formation of the magnetic path due to the holding section 26 is suppressed, it is possible to make the magnetic field generated by the coil 252 efficiently act on the permanent magnet 251. It should be noted that the nonmagnetic material constituting the holding section 26 is not particularly limited, there can be cited, for example, metal materials such as aluminum, titanium, and some sort of stainless steel, and resin materials such as rubber and plastic.

The support section 23 to which such a holding section 26 is fixed has the following configuration. That is, as shown in FIGS. 4A, 4B, and 7, the support section 23 has a frame-like shape surrounding the movable section 22, and includes a shaft connection section 231, which extends in the X-axis direction and to which the shaft section 24a is connected, a shaft connection section 232, which extends in the X-axis direction and to which the shaft section 24b is connected, a connection section 233 for connecting the shaft connection sections 231, 232 to each other on the +X-axis side of the movable section 22, and a connection section 234 for connecting the shaft connection sections 231, 232 to each other on the −X-axis side of the movable section 22.

The shaft connection sections 231, 233 are each made larger in thickness than the movable section 22 (see FIG. 5). Thus, the mechanical strength of the shaft connection sections 231, 232 increases, and thus, it is possible to stably support the shaft sections 24a, 24b. Therefore, it is possible to more stably oscillate the movable section 22 around the oscillation axis J.

On the other hand, the connection section 233 is provided with a fixation section 233a to which the holding section 26 is fixed, and a thin-wall section 233b thinner in wall than the shaft connection sections 231, 232. To the fixation section 233a, there is fixed the holding section 26 from the upper surface side with screw fixation. It should be noted that the fixation of the holding section 26 to the fixation section 233a is not limited to the screw fixation, but can also be fixation with concavo-convex fitting, or fixation using an adhesive.

Further, as shown in FIG. 7, the thin-wall section 233b is provided with a recessed section 235 opening in the lower surface, and when viewed from the +X-axis direction (i.e., a direction perpendicular to a direction (the Z-axis direction) in which the permanent magnet 251 and the coil 252 are arranged side by side), the gap (the gap G) between the permanent magnet 251 and the coil 252 can visually be recognized from the outside of the optical device 2. According to the fact described above, it can be said that the recessed section 235 constitutes a window section 236 for visually recognizing the gap G. By providing such a window section 236, whether or not the gap G has an appropriate size can easily be determined. In particular, in the present embodiment, since the surface 251a (the position of the surface 251a) of the permanent magnet 251 on the coil 252 side, and the surface 252a (the position of the surface 252a) of the coil 252 on the permanent magnet 251 side can visually be recognized via the window section 236, the gap G between these surfaces 251a, 252a can more accurately be determined. Further, when visually recognizing the gap G viewed from the +X-axis direction, since the visual line coincides with the surfaces 251a, 252a (since the surfaces 251a, 252a can be recognized as a line), the gap G can more clearly be recognized visually.

Since the gap G can visually recognized in such a manner as described above, it becomes easy to adjust the gap G. In order to prevent the contact between the permanent magnet 251 and the coil 252, and in order to make the magnetic field generated by the coil 252 more efficiently act on the permanent magnet 251, the highly accurate adjustment is required for the gap G. Therefore, by providing the window section 236 to make it possible to more accurately adjust the gap G, there can be provided the optical device 2 having an excellent oscillation characteristic.

In particular in the present embodiment, since the window section 236 is a through hole formed of the recessed section 235, the following advantages can be exerted. Firstly, compared to the case in which, for example, the recessed section 235 is blocked by a transparent member such as a glass material, since the reflection of the light and so on do not occur, the gap G can more clearly be recognized visually. Secondly, it is possible to insert and remove, for example, a tool for testing the size of the gap G (a gap forming member 9 to be sandwiched between the permanent magnet 251 and the coil 252 as is used in an manufacturing method described later) through the window section 236, and thus, it is also possible to physically checking the size of the gap G.

Hereinabove, the configuration of the optical device 2 is described in detail. It should be noted that although in the present embodiment, there is adopted a so-called "moving magnet type" drive mechanism 25 having the permanent magnet 251 provided to the movable section 22, the arrangement of the permanent magnet 251 and the coil 252 can also be reversed. Specifically, there can be adopted a so-called "moving coil type" drive mechanism 25 having the coil 252 provided to the movable section 22. It should be noted that by adopting the "moving magnet type" drive mechanism 25 as in the present embodiment, it is difficult for the heat of the coil 252 generated by supplying the power to propagate to the movable section 22 and the glass plate 21, and thus, the variation in vibration characteristic (variation in resonant frequency) and the deflection of the glass plate 21 due to the heat can effectively be suppressed.

3. Method of Manufacturing Optical Device

Then, a method of manufacturing the optical device 2 will be explained.

The method of manufacturing the optical device 2 includes a first process of preparing a structure 20 provided with the permanent magnet 251 and the holding section 26 holding the coil 252, a second process of fixing the holding section 26 to the structure 20 in the state in which the gap forming member 9 having a plate-like shape is sandwiched between the permanent magnet 251 and the coil 252, and a third process of removing the gap forming member 9. Hereinafter, the manufacturing method will specifically be explained.

First Process

Firstly, the structure 20 is formed using mechanical processing and injection molding, and then, as shown in FIG. 8A, the glass plate 21 and the permanent magnet 251 are disposed on the structure 20. Further, the holding section 26 is formed, and then the coil 252 is disposed on the holding section 26.

Second Process

Then, as shown in FIG. 8B, the holding section 26 is screwed to the structure 20 in the state in which the gap forming member 9 is sandwiched between the permanent magnet 251 and the coil 252. The gap forming member 9 has a thickness corresponding to the gap G thus set, and by sandwiching the gap forming member 9 between the permanent magnet 251 and the coil 252, the gap G between the permanent magnet 251 and the coil 252 can easily be adjusted to the set value. It should be noted that if the gap forming member 9 does not move despite the trial of moving the gap forming member 9 between the permanent magnet 251 and the coil 252, there is a possibility that the gap G between the permanent magnet 251 and the coil 252 becomes smaller than the setting value, and on the contrary, in the case in which the gap forming member 9 moves with wobbling, there is a possibility that the gap G becomes larger than the setting value. Therefore, the clamping strength of the holding section 26 to the fixation section is adjusted so that the gap forming member 9 appropriately moves between the permanent magnet 251 and the coil 252.

Third Process

Then, by removing the gap forming member 9 via the window section 236, the optical device 2 can be obtained as shown in FIG. 8C.

According to such a manufacturing method, it is possible to obtain the optical device 2 having the gap G adjusted with accuracy.

Second Embodiment

Figure 9:
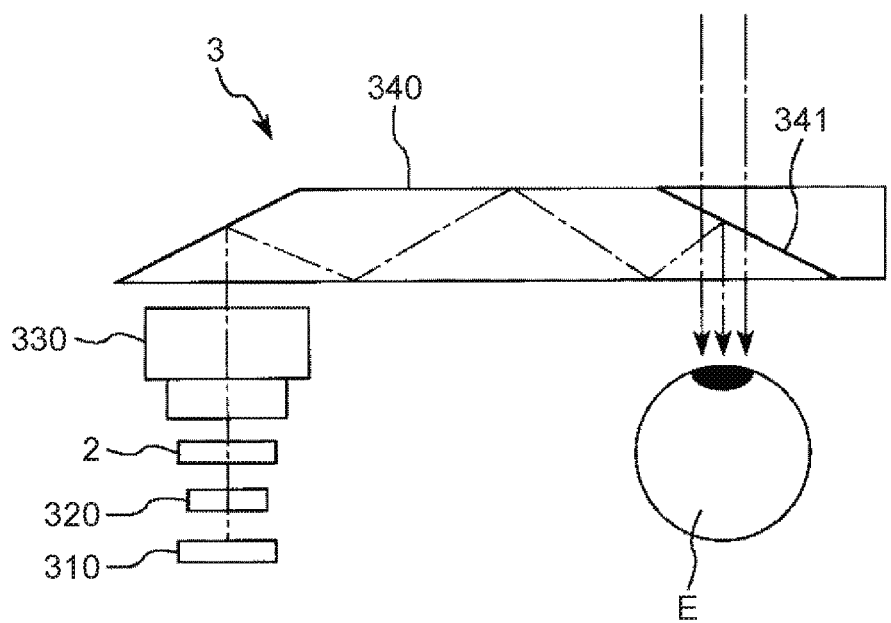
FIG. 9 is a diagram showing an optical configuration of an image display device according to a second embodiment of the invention.

FIG. 9 is a diagram showing an optical configuration of an image display device according to a second embodiment of the invention.

Hereinafter, the image display device according to the second embodiment of the invention will be explained with a focus mainly on the differences from the embodiment described above, and the explanation regarding substantially the same matters will be omitted.

The image display device according to the second embodiment is a semi-transmissive (see-through) head-mounted display (hereinafter simply referred to as "HMD").

The HMD (image display device) 3 according to the present embodiment is used while being worn by the observer (the user), and includes a light source 310, a liquid crystal display element 320, a projection lens system 330, a light guide section 340, and the optical device 2 as shown in FIG. 9. The light source 310 is not particularly limited, but a backlight formed of an LED, for example, can be used. The light generated from such a light source 310 is guided to the liquid crystal display element 320. The liquid crystal display element 320 is a transmissive liquid crystal display element, and for example, an HTPS (high-temperature polysilicon) single panel TFT color liquid crystal panel can be used. Such a liquid crystal display element 320 modulates the light from the light source 310 to generate the picture light. The picture light thus generated is enlarged by the projection lens system, and then enters the light guide section 340. The light guide section 340 has a plate-like shape, and further, a half mirror 341 is disposed on the downstream side along the propagation direction of the light. The light guided to the inside of the light guide section 340 proceeds while repeating reflection, and is guided to the pupil E of the observer by the half mirror 341. Further, in accordance therewith, the outside light is guided to the pupil E of the observer through the half mirror 341. Therefore, in the HMD 3, it results that the picture light is visually recognized so as to be superimposed on the background view.

In the HMD 3 having such a configuration, the optical device 2 is disposed between the liquid crystal display element 320 and the projection lens system 330, and thus, the optical axis of the picture light can be shifted.

According also to such a second embodiment as described hereinabove, substantially the same advantages as in the first embodiment described above can be exerted.

Third Embodiment

Figure 10:
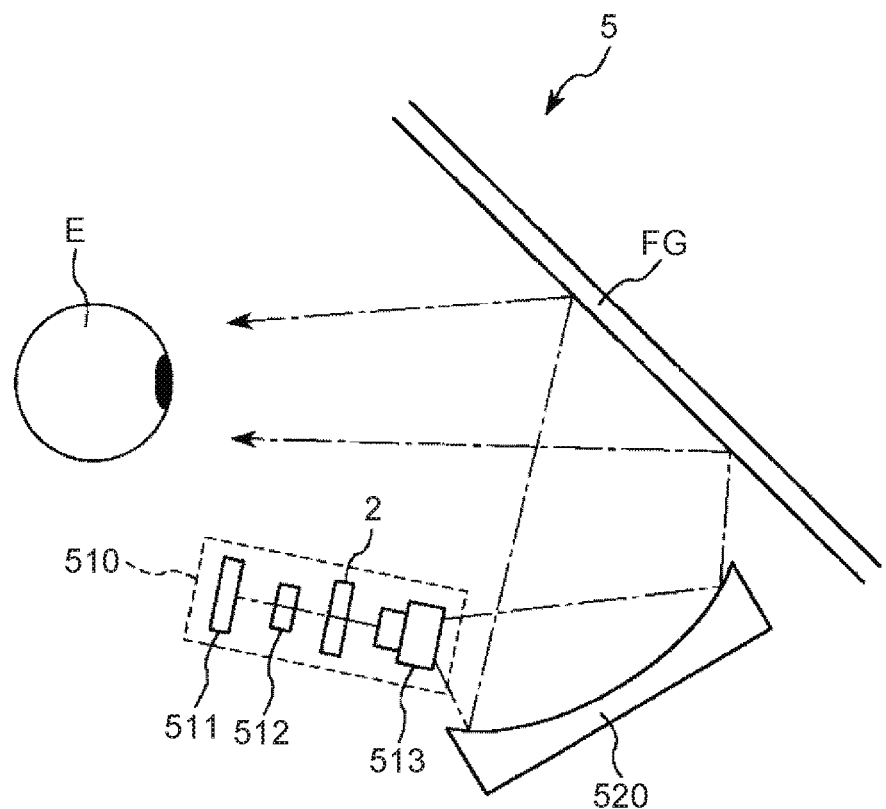
FIG. 10 is a diagram showing an optical configuration of an image display device according to a third embodiment of the invention.

FIG. 10 is a diagram showing an optical configuration of an image display device according to a third embodiment of the invention.

Hereinafter, the image display device according to the third embodiment of the invention will be explained with a focus mainly on the differences from the embodiment described above, and the explanation regarding substantially the same matters will be omitted.

The image display device according to the third embodiment is a head-up display (hereinafter simply referred to as "HUD").

The HUD (image display device) 5 according to the present embodiment is mounted on, for example, a vehicle and is used for projecting a variety of types of information (pictures) such as the speed, the time, and the travel distance to the driver via a windshield FG. As shown in FIG. 10, such an HUD 5 includes a projection unit 510 having a light source 511, a liquid crystal display element 512, and a projection lens system 513, a reflecting mirror 520, and the optical device 2. The light source 511, the liquid crystal display element 512, and the projection lens system 513 can be provided with, for example, substantially the same configurations of the light source 310, the liquid crystal display element 320, and the projection lens system 330 in the second embodiment described above, respectively. The reflecting mirror 520 is a concave mirror, and reflects the projection light from the projection unit 510 to project (display) the projection light on the windshield FG.

In the HUD 5 having such a configuration, the optical device 2 is disposed between the liquid crystal display element 512 and the projection lens system 513, and thus, the optical axis of the projection light can be shifted.

According also to such a third embodiment as described hereinabove, substantially the same advantages as in the first embodiment described above can be exerted.

Fourth Embodiment

Figure 11:
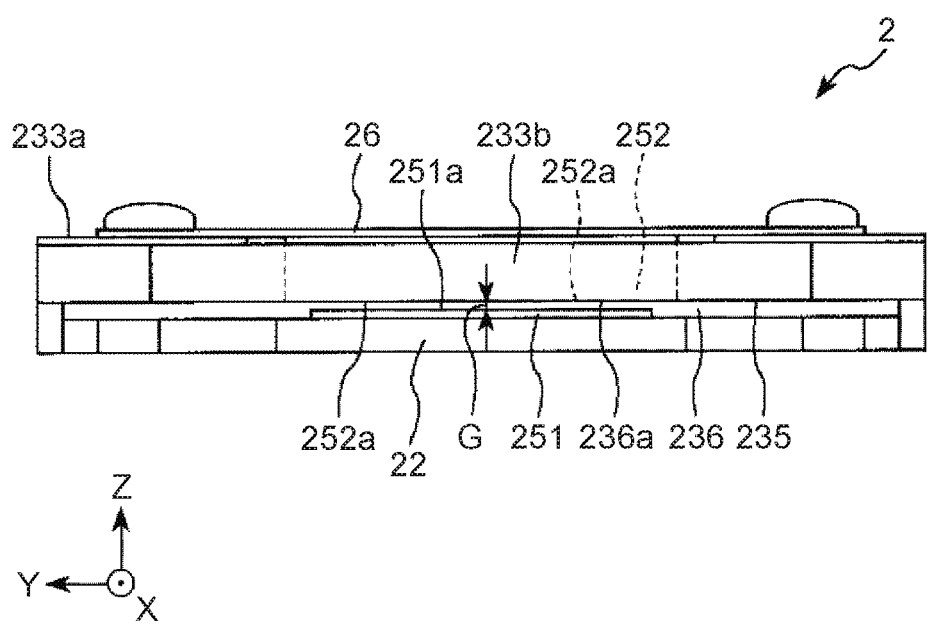
FIG. 11 is a cross-sectional view of an optical device provided to an image display device according to a fourth embodiment of the invention.

FIG. 11 is a cross-sectional view of an optical device provided to an image display device according to a fourth embodiment of the invention.

Hereinafter, the image display device according to the fourth embodiment of the invention will be explained with a focus mainly on the differences from the embodiment described above, and the explanation regarding substantially the same matters will be omitted.

The image display device according to the fourth embodiment is substantially the same as the first embodiment described above except the point that the configuration of the optical device is different. It should be noted that the constituents substantially the same as those of the embodiment described above are denoted by the same reference symbols.

As shown in FIG. 11, in the optical device 2 according to the present embodiment, a surface 236a constituting at least a part of a window section 236 (in other words, it can be said as a lower surface of a thin-wall section 233b, or a bottom surface of a recessed section 235) and a surface 252a of the coil 252 roughly coincide with each other. Thus, since a gap between the surface 236a and a surface 251a of the permanent magnet 251 becomes equal to the gap G, the gap G can more easily be checked. Further, since it is sufficient to screw the holding section 26 to a fixation section 233a so that the surface 252a of the coil 252 coincides with the surface 236a of the window section 236 in the manufacturing process, the adjustment of the gap G becomes easier.

According also to such a fourth embodiment as described hereinabove, substantially the same advantages as in the first embodiment described above can be exerted.

It should be noted that although in the present embodiment the moving magnet type is adopted, and the holding section 26 holds the coil 252, and therefore, the surface 236a of the window section 236 and the surface 252a of the coil 252 coincide with each other, in the case in which the moving coil type is adopted, and the holding section 26 holds the permanent magnet 251, on the contrary, it is sufficient that the surface 236a of the window section 236 and the surface 251a of the permanent magnet 251 coincide with each other.

Fifth Embodiment

Figure 12:
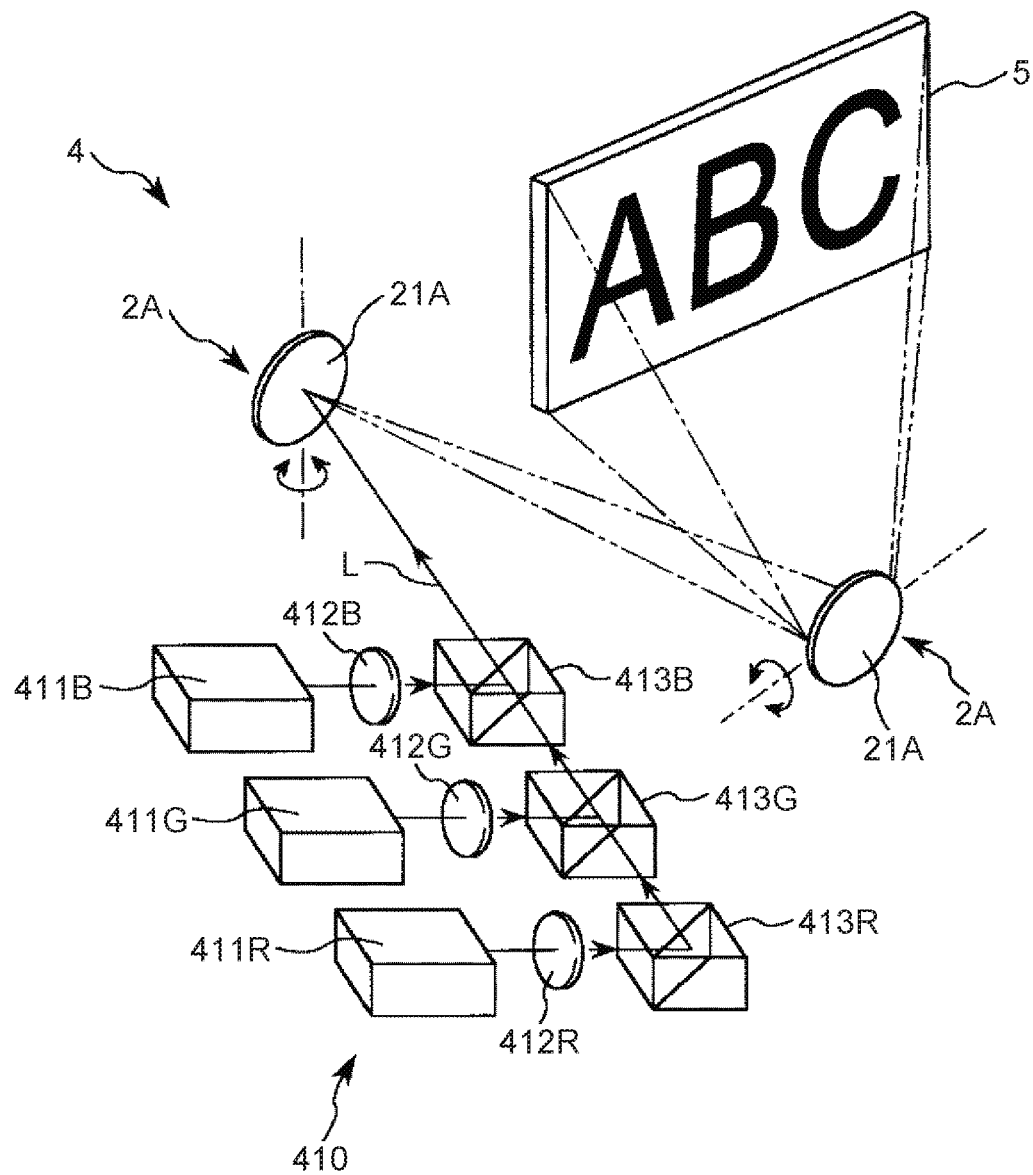
FIG. 12 is a diagram showing an optical configuration of an image display device according to a fifth embodiment of the invention.

FIG. 12 is a diagram showing an optical configuration of an image display device according to a fifth embodiment of the invention. FIGS. 13A and 13B are a top view and a bottom view, respectively, of an optical device provided to the image display device shown in FIG. 12.

Hereinafter, the image display device according to the fifth embodiment of the invention will be explained with a focus mainly on the differences from the embodiment described above, and the explanation regarding substantially the same matters will be omitted.

The image display device according to the fifth embodiment is different from the device according to the first embodiment described above in the point that the device is a scan type image display device. It should be noted that the constituents substantially the same as those of the embodiment described above are denoted by the same reference symbols.

As shown in FIG. 12, a projector (the image display device) 4 according to the present embodiment is a device for scanning the object 6 such as a screen or a wall surface two-dimensionally with a drawing laser beam L to thereby display an image. The projector 4 includes a drawing light source unit 410 for emitting the drawing laser beam L, and two optical devices 2A as a light scanner for performing the scanning operation with the drawing laser beam L. In such a projector 4, the two optical devices 2A are arranged so that the scanning directions with the drawing laser beams are perpendicular to each other. Further, it is arranged that, for example, one of the optical devices 2A moves the drawing laser beam L in a horizontal direction for performing the scanning operation, and the other of the optical devices 2A moves the drawing laser beam L in a vertical direction for performing the scanning operation to thereby make it possible to display a two-dimensional image on the object 6.

The drawing light source unit 410 is provided with laser sources 411R, 411G, and 411B for respective colors of red, green, and blue, and collimator lenses 412R, 412G, and 412B, and dichroic mirrors 413R, 413G, and 413B disposed so as to correspond to the laser sources 411R, 411G, and 411B. Similarly to the second embodiment described above, the dichroic mirrors 413R, 413G, and 413B combine the lasers of the respective colors of red, green, and blue to form the drawing laser beam L.

As shown in FIGS. 13A and 13B, the optical devices 2A each have the movable section 22 having a plate-like shape, and are each provided with a light reflecting section (an optical section) 21A having a light reflecting property disposed on a surface of the movable section 22. Thus, when oscillating the movable section 22 around the oscillation axis, it is possible to move the drawing laser beam L having been reflected by the light reflecting section 21A to perform the scanning operation.

According also to such a fifth embodiment as described above, substantially the same advantages as in the first embodiment described above can be exerted.

Although the optical device and the image display device according to the invention are explained hereinabove based on the illustrated embodiments, the invention is not limited to these embodiments. For example, in the optical device and the image display device according to the invention, the configuration of each section can be replaced with an arbitrary configuration having substantially the same function, and further, it is also possible to add other arbitrary constituents.

Further, although in the embodiments described above, the liquid crystal projector and the light scanning projector are explained as the image display device, the image display device is not limited to the projectors, but can also be applied to printers, scanners, and so on besides the projectors.

Further, although in the embodiments described above, the projector using the liquid crystal display element is explained, the projector is not limited to the embodiments, but can also be, for example, a scanner type projector. Specifically, there is adopted a projector for displaying a picture by performing the two-dimensional scanning operation with the laser generated by combining a blue laser, a red laser, and a green laser using a light scanner.

The entire disclosure of Japanese Patent Application No. 2014-265636, filed Dec. 26, 2014 is expressly incorporated by reference herein.

What is claimed is:

1. An optical device comprising:
   an optical section having a plane of incidence of light to which light can be input;
   a movable section adapted to support the optical section;
   a shaft section adapted to support the movable section so as to be able to oscillate around an oscillation axis;
   a support section adapted to support the shaft section;
   a permanent magnet provided to the movable section; and
   a coil disposed so as to be opposed to the permanent magnet, and generating a magnetic field acting on the permanent magnet,
   wherein the support section has a window section through which a gap between the permanent magnet and the coil can be visually recognized.

2. The optical device according to claim 1, wherein the window section is a through hole.

3. The optical device according to claim 1, wherein a position of a surface of the permanent magnet, with that surface facing the coil, and a position of a surface of the coil, with that surface facing the permanent magnet, can be visually recognized through the window section.

4. The optical device according to claim 1, wherein when viewed through the window section, one of the side surfaces constituting the window section coincides with one of the surface of the permanent magnet, with that surface facing the coil, and the surface of the coil, with that surface facing the permanent magnet.

5. The optical device according to claim 1, wherein the gap can be visually recognized through the window section from a direction perpendicular to a direction in which the permanent magnet and the coil are arranged.

6. The optical device according to claim 1, wherein the coil is an air core coil.

7. The optical device according to claim 1, wherein the coil is supported by the support section.

8. The optical device according to claim 7, further comprising:
   a holding section fixed to the support section, and holding the coil from an opposite side to the permanent magnet.

9. The optical device according to claim 8, wherein the holding section is made of a nonmagnetic material.

10. The optical device according to claim 1, wherein the movable section and the shaft section each include a resin material.

11. The optical device according to claim 1, wherein the optical section transmits the light.

12. The optical device according to claim 1, wherein the optical section reflects the light.

13. An image display device comprising:
    the optical device according to claim 11,
    wherein the image display device is configured so as to make the optical device spatially modulate the light to thereby shift a position of a pixel displayed by irradiation of the light.

14. An image display device comprising:
    the optical device according to claim 12,
    wherein the image display device reflects the light with the optical device to perform a scanning operation to thereby display an image.

15. A method of manufacturing an optical device comprising:
    providing a structure including
        an optical section having a plane of incidence of light to which the light is input,
        a movable section adapted to support the optical section,
        a shaft section adapted to support the movable section so as to be able to oscillate around an oscillation axis,
        a support section adapted to support the shaft section,
        a permanent magnet provided to the movable section, and
        a window section, which is provided to the support section, and through which a gap between the permanent magnet and a coil can visually be recognized;
    disposing the coil so as to be opposed to the permanent magnet in a state in which a gap forming member is disposed between the permanent magnet and the coil; and
    removing the gap forming member from an area between the permanent magnet and the coil through the window section.

* * * * *